June 10, 1930.                H. SEBELL                 1,762,532
                        METHOD OF MAKING CANS
             Filed March 12, 1929        2 Sheets-Sheet 1

Inventor
Harry Sebell
by Heard Smith & Tennant
Attys

June 10, 1930.  H. SEBELL  1,762,532
METHOD OF MAKING CANS
Filed March 12, 1929  2 Sheets-Sheet 2

Inventor
Harry Sebell
by Heard Smith & Tennant.
Attys.

Patented June 10, 1930

1,762,532

UNITED STATES PATENT OFFICE

HARRY SEBELL, OF BOSTON, MASSACHUSETTS, ASSIGNOR OF ONE-HALF TO ARTHUR H. PARKER, OF LEXINGTON, MASSACHUSETTS

METHOD OF MAKING CANS

Application filed March 12, 1929. Serial No. 346,321.

This invention relates to making tin cans and particularly to the soldering or securing of the can end in the can body.

In some tin cans the can end is smaller than the can body so that when the can end is in place there is a gap between the periphery of the can end and the can body, which gap is sealed or filled with suitable sealing material that is easily cut with a can opener or can be easily removed thereby to facilitate the opening of the can.

It has also been proposed to make a can in which the can end is of a size to fit the can body and is formed near its periphery with a slot which is filled with some easy cutting material so that when the can is to be opened the can opener is thrust through the slot and the can is cut along the zone of solder or easily cut material.

My invention relates to a method of making a can which is particularly advantageous in securing the can end to the can body in cans of the type above referred to.

In practising my invention I employ a plunger which fits the interior of the can body and one end of which has a shape complemental to that of the can, said end of the plunger constituting a can-end positioning element and also a dam to close the gap or slit during the soldering operation. This plunger is placed in the can body and material, then the plunger will support the can end is applied to the can-end-receiving face of the plunger. The plunger is then so positioned in the can body as to place the can end in proper position for sealing and when in this position the plunger not only holds the can body and the can end in proper relative position but also forms a dam which closes the gap between the can end and the can body, if the can end is of the type which is smaller than the body, or the gap formed by the slit in the can end, if said can end is of the type that has the slit therein as above referred to.

With the plunger supporting the can end and holding it properly centered and positioned relative to the can body, the can end is soldered or otherwise secured to the can body. If the can end is of the type which is smaller than the can body so that there is an annular gap existing between the can end and the can body then the securing of the can end to the body is performed by closing this gap with same sealing material by which the can end is united to the can body. This sealing material may be in the form of a sealing wire or sealing strip which is laid in the gap and then soldered to both the can end and can body. If such be the case the plunger furnishes means not only to position the can end but also to support the sealing wire while it is being soldered in place. If this gap is filled with solder or some other molten sealing material which is poured into the gap then the plunger acts as a dam which closes the gap and holds the molten sealing material in place until it cools.

If on the other hand, the can end is of a size to fit the can body but is provided with an annular slit or slot that is to be filled with solder or some easily cut material, then the plunger will support the can end properly while it is being soldered to the can body and also while the slot is being filled with the solder or easily-cut material. In this case also the plunger forms a dam for closing the slot in the cover when the solder is poured thereinto. In both instances too, the plunger makes a solid rest or support for the cover during the soldering operation. This method is used in securing a can end to a can body which is open at both ends and after the can end has been secured the plunger may be withdrawn from the can body through the other end which is still open.

In order to give an understanding of the invention I have illustrated in the drawings some selected embodiments thereof which will now be described after which the novel features will be pointed out in the appended claims.

Figure 1:
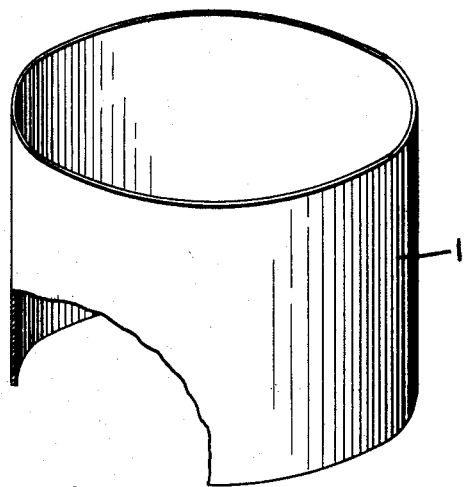
Fig. 1 is a perspective view of a can body which is open at both ends and before the can ends are attached.
Figure 3:
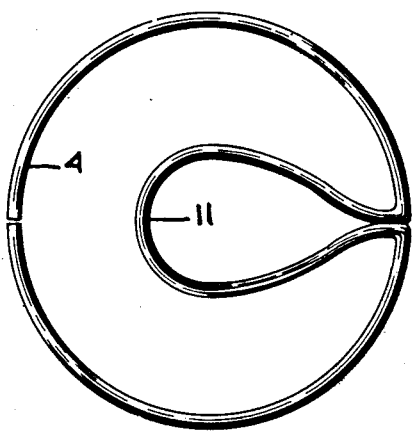
Fig. 3 is a view of a sealing wire which may be employed in uniting the can end shown in Fig. 2 to the can body shown in Fig. 1.

In the drawings 1 indicates a can body which is made in usual way but which is open at both ends. As stated above some tin cans are formed with a can end which is smaller than the can so that when the can end is in place there will be an annular gap existing between the periphery of the can end and can body, which gap is filled by some suitable sealing material.

Figure 2:
Fig. 2 is a perspective view with a part broken out showing a can end of the type which is smaller than the can body and which is secured in place through the medium of a sealing wire or other sealing means interposed in the gap between the periphery of the can end and the can body.
Figure 6:
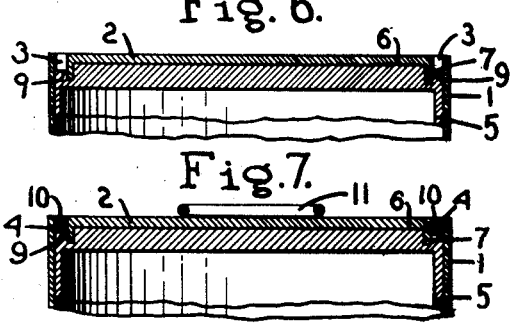
Figs. 4, 5, 6 and 7 illustrate more or less diagrammatically steps in my improved process of securing the can end shown in Fig. 2 to the can body shown in Fig. 1.
Figure 7:
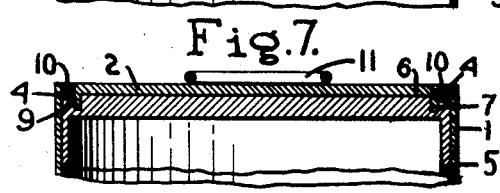
Figure 10:
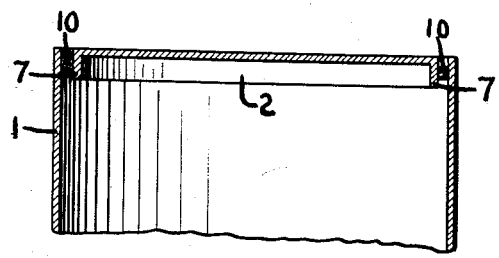

In Fig. 2 I have illustrated at 2 a can end of this description, said end being smaller than the can body so that when the can end is in place in the can body as shown in Fig. 6 there will be a gap 3 existing between the periphery of the can end and the can body. This gap may be filled with a sealing wire indicated at 4 which is soldered to the periphery of the can end and to the can body as shown in Fig. 7, or may be sealed with sealing material such as solder, which when cooled becomes fused to the periphery of the can end 2 and the walls of the can body 1 thereby sealing the can end as shown in Fig. 10.

My improved method involves the use of a plunger 5 which is of a size to fit the interior of the can body 1 and one end 6 of which constitutes a can-end-positioning face, said end having a shape complemental to that of the can end. The can end shown in Fig. 2 is provided with a peripheral flange 7 and the face 6 of the plunger will, therefore, have an annular groove 8 to receive the flange 7, the portion of the face 6 within the groove 8 having the same contour or shape as the main body of the can end 2. When, therefore, the plunger is inserted into the can body and a can end is applied to the face 6 of the plunger, said can end and can body will be properly positioned relative to each other for being sealed or connected together.

Figure 4:
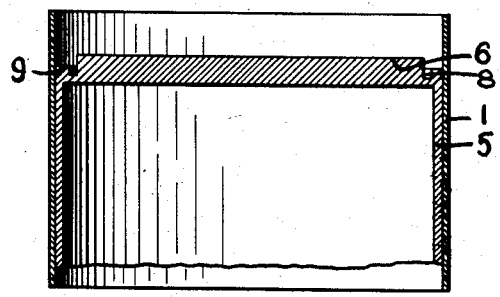
Figure 8:
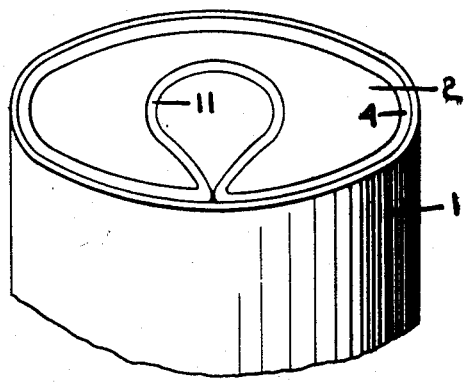
Fig. 8 is a perspective view of the upper end of a sealed can.
Figure 5:
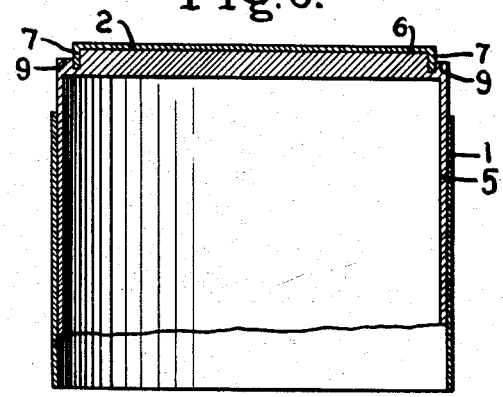

In carrying out the invention the plunger 5 is introduced into the can body 1 and a can end 2 is applied to the face 6 of the plunger and the latter is then positioned within the can body so as to place the can end in proper position for being sealed to the can body. This may be done by introducing the plunger into the lover end of the can body as shown in Fig. 4 and then carrying the plunger up through the can body into the position shown in Fig. 5, and while in this position applying a can end 2 to the face 6 of the plunger and then bringing the plunger back to the position shown in Fig. 6, in which it positions the can end and can body relative to each other thereby forming the annular gap 3.

If the can is to be sealed by the use of a sealing wire 4, then said sealing wire will be placed in the gap 3 and will be soldered to the periphery of the can end 2 and the walls of the can body by any suitable soldering devices appropriate for the purpose.

The plunger 5, which fills the can body, is formed with the annular surface 9 outside of the groove 8, this surface 9 constituting a supporting surface for the wire 4 and also a dam to close the gap 3. When the wire 4 is placed in the gap 3, therefore, it is forced down until it engages the surface 9 and while in this position solder 10 is applied thereby to solder the wire both to the periphery of the end and the wall of the can body. After the soldering operation has been completed the plunger 5 may be withdrawn from the lower end of the can body.

A can end which is sealed with the sealing wire 4 is intended to be opened by pulling the sealing wire out from the gap 3 and to facilitate this operation the sealing wire is herein shown as provided with a loop 11 which lies on top of the can end and forms a handle by which the wire may be grasped for pulling it out of the gap 3.

Figure 9:
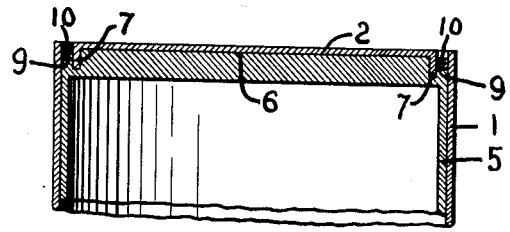
Figs. 9 and 10 illustrate a can made in accordance with my invention, in which the cap between the periphery of the can end and the can body is filled with sealing material such as solder.

If the can end 2 is to be secured to the can body by filling the gap 3 with solder or some other similar sealing material then such sealing material will be poured or flowed into the gap 3 while the plunger 5 is in the position shown in Fig. 9 and during this operation the surface 9 of the plunger forms a dam for closing the gap 3 and preventing the sealing material from flowing into the can body. The surface 9 of the plunger will have such characteristics that the solder or sealing means will not adhere thereto, it being understood, of course, that such sealing means will firmly adhere to the periphery of the can end and the walls of the can body. When the sealing means has set or cooled the plunger may be removed and the can end will be thoroughly sealed in position.

Figure 11:
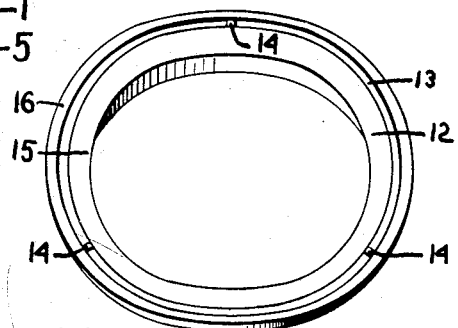
Fig. 11 is a perspective view of a can end of a different type which may be united to the can end by my invention.

Another type of can which can be made according to my method is one in which the can end is of a size to fit the can body but is provided with an annular slot that is filled with solder or some easily-cut material so that when the can is to be opened the can end can be cut along the zone of easily cut material. A can end having this construction is shown in Fig. 11 and it is indicated at 12. This can end is formed with a slit or slot 13 which is located adjacent the edge of the can end and which, if desired, may be divided into sections by bridge portions 14 which are formed by uncut portions of the can end which connect the central portion 15 thereof with the peripheral portion 16.

Figure 12:
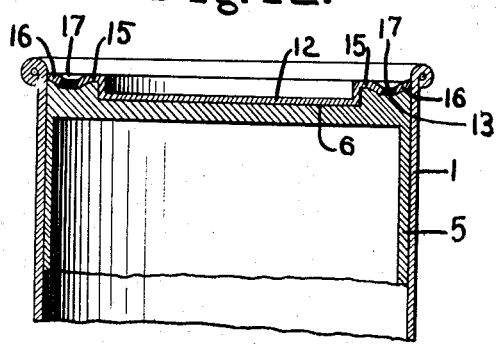
Fig. 12 illustrates the manner in which the can end shown in Fig. 11 is secured to the can body.

In carrying out my invention with a can end of this construction the can end will be positioned within the can by the plunger as shown in Fig. 12 and while so positioned the can end will be soldered to the can and at the same time the sectional slot 13 may be closed by a film of solder 17. During this soldering operation the end surface of the plunger forms a dam which closes the slot 13 so that the solder which is flowed into the slot will remain until it has cooled and will not flow into the can. This plunger also makes a solid support for the can end during the soldering operation so that any necessary pressure may be applied to the can end by the soldering implements without danger that the position of the can end will be shifted out of its correct position while the soldering is being done.

Figure 13:
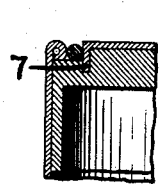
Fig. 13 illustrates still a different embodiment of the invention.
Figure 13:
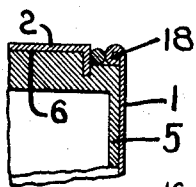

In the constructions above described, the can body is either provided with a bead on its exterior at the end or is formed without any bead. In Fig. 13 I have shown a type of can in which the can body 1 is provided at its end with a bead 18 on the inside of the can. When my improved method is used in securing a can end 2 to a can having this construction, the bead 18 may be used as a stop to automatically position the plunger 5 for the soldering operation. When the plunger has been inserted into the lower end of the can and has been brought up against the bead 18, as shown in Fig. 13, then the face 6 of the plunger will be properly positioned to place the can end 2 in the correct position for being attached to the can body. If the can end 2 is of the type shown in Fig. 13, which is smaller than the interior diameter of the bead 18 and which is to be secured to the can body through the medium of a sealing wire 4, then, of course, the plunger 5 will serve to position the sealing wire as well as the can end during the soldering operation. Because of the fact that the soldering occurs between the bead 18 and the periphery of the can end 2, there is no danger that a film of solder will collect beneath the wire which will span the gap between the flange 7 and the wall of the can, as might occur in the construction shown in Fig. 7. If, during the soldering of the sealing wire 4 in Fig. 7 to the can body and can end, a film of solder collects underneath the wire, such film of solder would form a connection between the can end and the wall of the can body which might not be disrupted when the wire is pulled out. With the construction shown in Fig. 13, however, this will not happen because the inner wall of the can body is spaced from the wire by the thickness of the bead 18.

I claim:

1. The process of making a can which consists in forming a can body open at both ends, introducing into the can body a plunger which fits the interior of the can body and is provided at one end with a can-end positioning face, applying to said face a can end which is smaller than the can body, locating the plunger relative to the can body so as to place the can end in sealing position, in which position there will be a gap existing between the periphery of the can end and can body, which gap is closed by said plunger, and then filling said gap with sealing material.

2. The method of making a can which consists in forming a can body which is open at both ends, introducing into said can body a plunger which fits said body and is provided with a can-end positioning face, applying to said face a can end which is constructed so that when it is in sealing position there will be an unsealed gap in the can end which is temporarily closed by said face of the plunger, arranging the plunger so as to place the can end in sealing position and then sealing the can end to the can body and filling said gap with sealing material.

In testimony whereof, I have signed my name to this specification.

HARRY SEBELL.